United States Patent

[11] 3,577,902

[72] Inventor Thomas E. Gardner
Sunnyvale, Calif.

[21] Appl. No. 775,673

[22] Filed Nov. 14, 1968

[45] Patented May 11, 1971

[73] Assignee United Aircraft Corporation
East Hartford, Conn.

[54] DIGITAL INTEGRATOR
2 Claims, 9 Drawing Figs.

[52] U.S. Cl. ........ 98/1.5

[51] Int. Cl. ........ B64d 13/04

[50] Field of Search ........ 98/1.5

[56] References Cited

UNITED STATES PATENTS

| | | | |
|---|---|---|---|
| 3,373,675 | 3/1968 | Best | 98/1.5 |
| 3,376,803 | 4/1968 | Emmons | 98/1.5 |
| 3,434,407 | 3/1969 | Best | 98/1.5 |

*Primary Examiner*—Meyer Perlin
*Attorney*—Melvin Pearson Williams

ABSTRACT: An aircraft cabin air pressure controller includes a digital integrator having a 1023 counter and a counter which is adjustable for counts of 1022, 1023, or 1024. The two counters are used with a set-reset flip-flop to form a pulsewidth modulator. The digital integrator can cause an increase in the width of the pulsewidth modulated signal by counting to 1024, can cause a decrease in the width of the pulsewidth modulated signal by counting to 1022, or it can hold the width of the signal by counting to 1023, which is the same count as given by the reference counter. The rate of pressure change created by the system is governed by the occurrence of special counts in the variable counter, the counter counting to 1023, many, many times between each command which causes the counter to either count to 1022 or to 1024, under the control of a manually adjustable rate clock. The output of the digital integrator is filtered and passed into a summing network together with an actual cabin pressure signal so as to generate an error signal for controlling the pressurization system. In addition, the error signal is fed into a 60-foot limiter that prevents the error signal from varying from the actual cabin pressure by more than the pressure equivalent to 60 feet of altitude at sea level density. Whenever a 60-foot limit is reached, control of the digital integrator is taken over by an automatic tracking circuit which causes the digital integrator to generate a pressure reference signal at a rate of change which is much faster than the maximum permissible manual rate of pressure change. Thus, the 60-foot limit controls the actual pressure error signal by analog means, and additionally provides digital control for automatic tracking of the digital integrator so that it will be brought into correspondence with the pressure command which is integrally forced on the system by the 60-foot limiter. The 60-foot limiter comprises a digital indicating analog clamp having a pair of differentially operable, complementary transistors in the feedback loop such that when the error signal exceeds a given magnitude, an appropriate one of the transistors will conduct, which inserts a small resistor in parallel with a large feedback resistor, and which also provides a digital output signal indicating that the maximum error signal has in fact been exceeded.

FIG. 1 SYSTEM
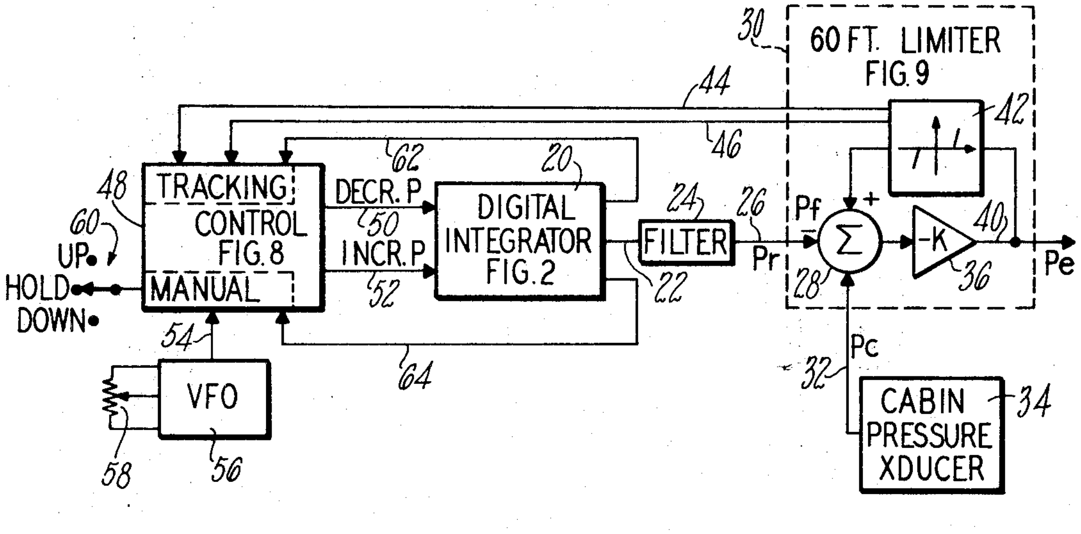
FIG. 2 DIGITAL INTEGRATOR
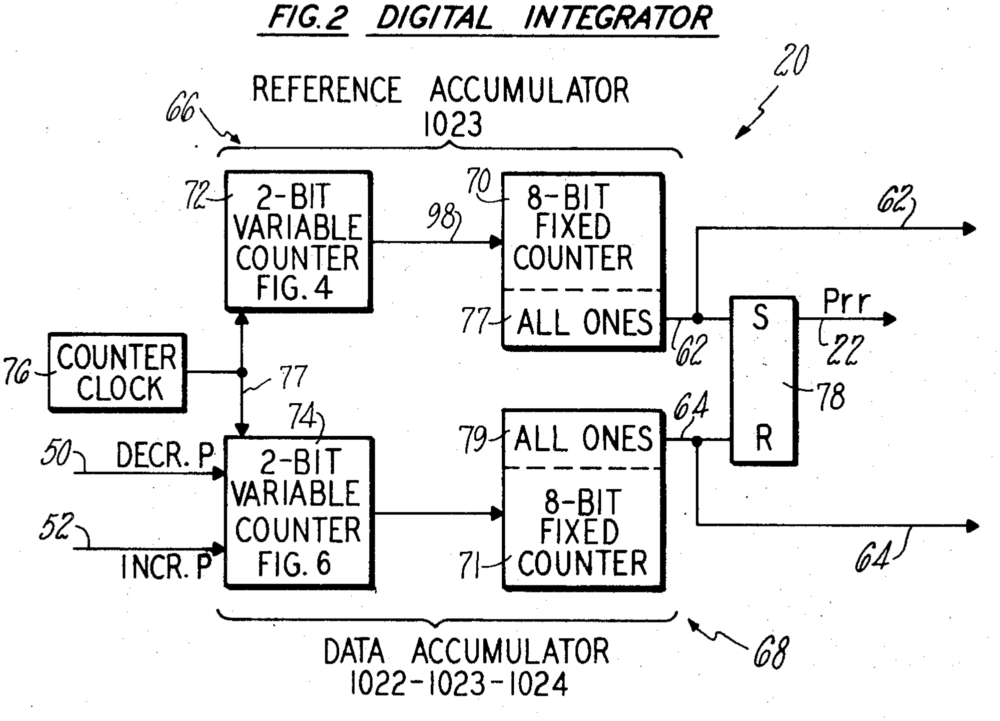
INVENTOR
THOMAS E. GARDNER
BY Melvin Pearson Williams
ATTORNEY FIG. 4 VARIABLE COUNTER NO. 1 (REFERENCE REGISTER)
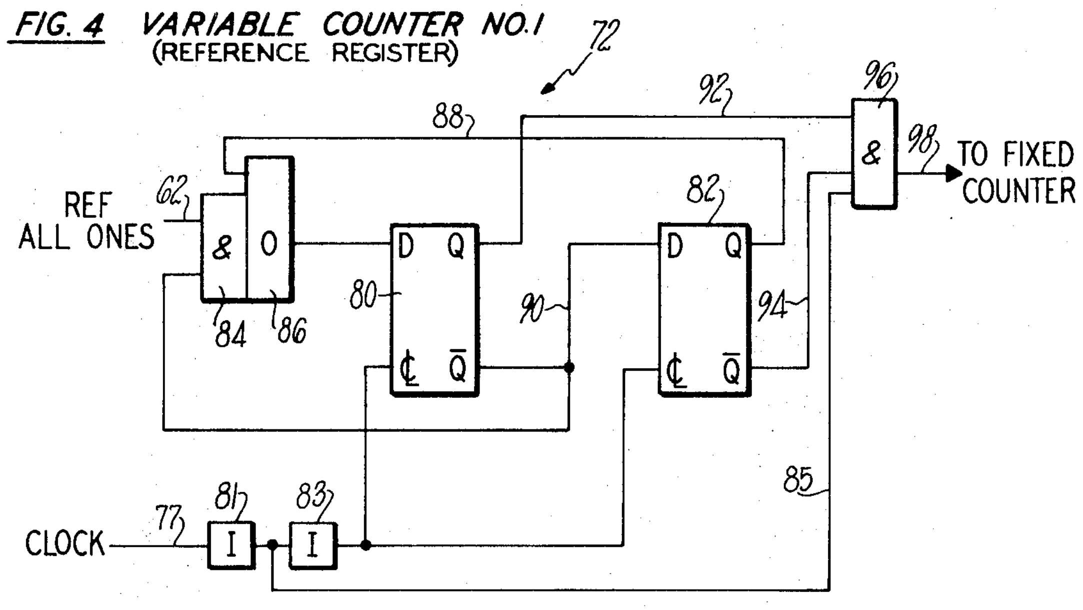
FIG. 5
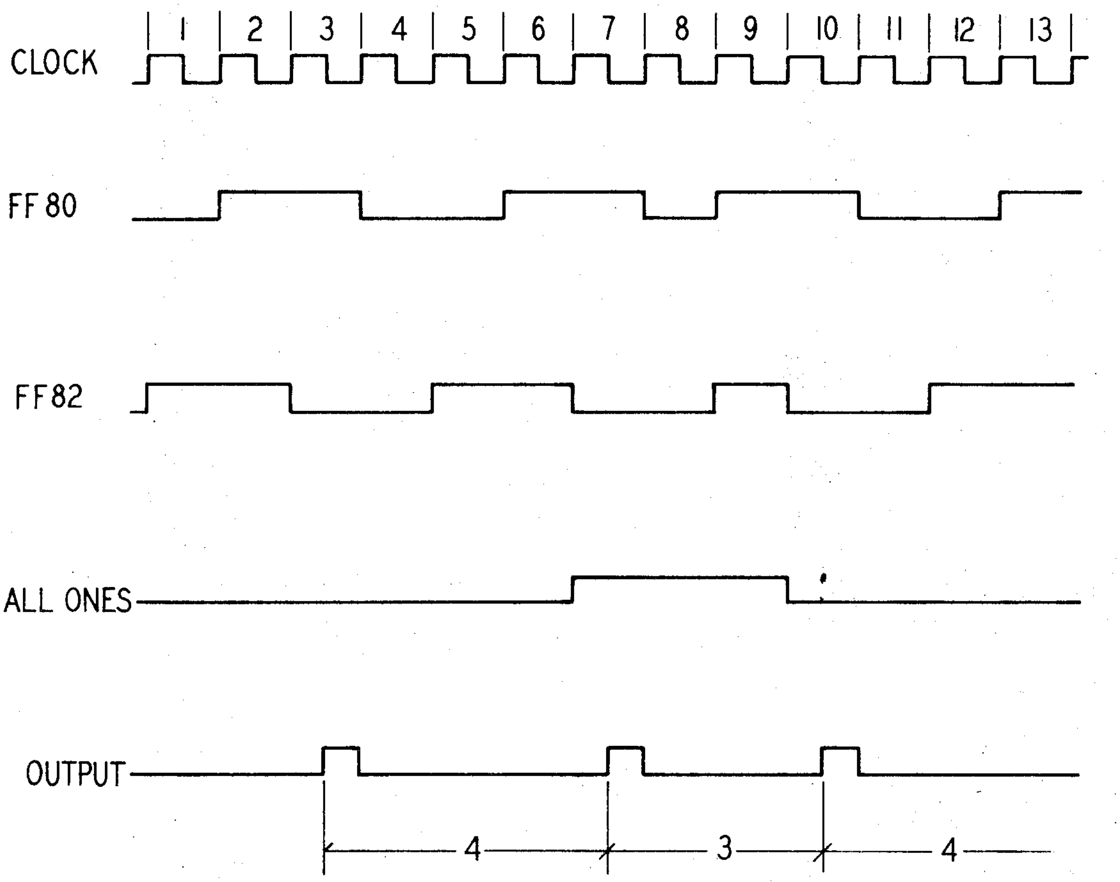

FIG. 8 CONTROL
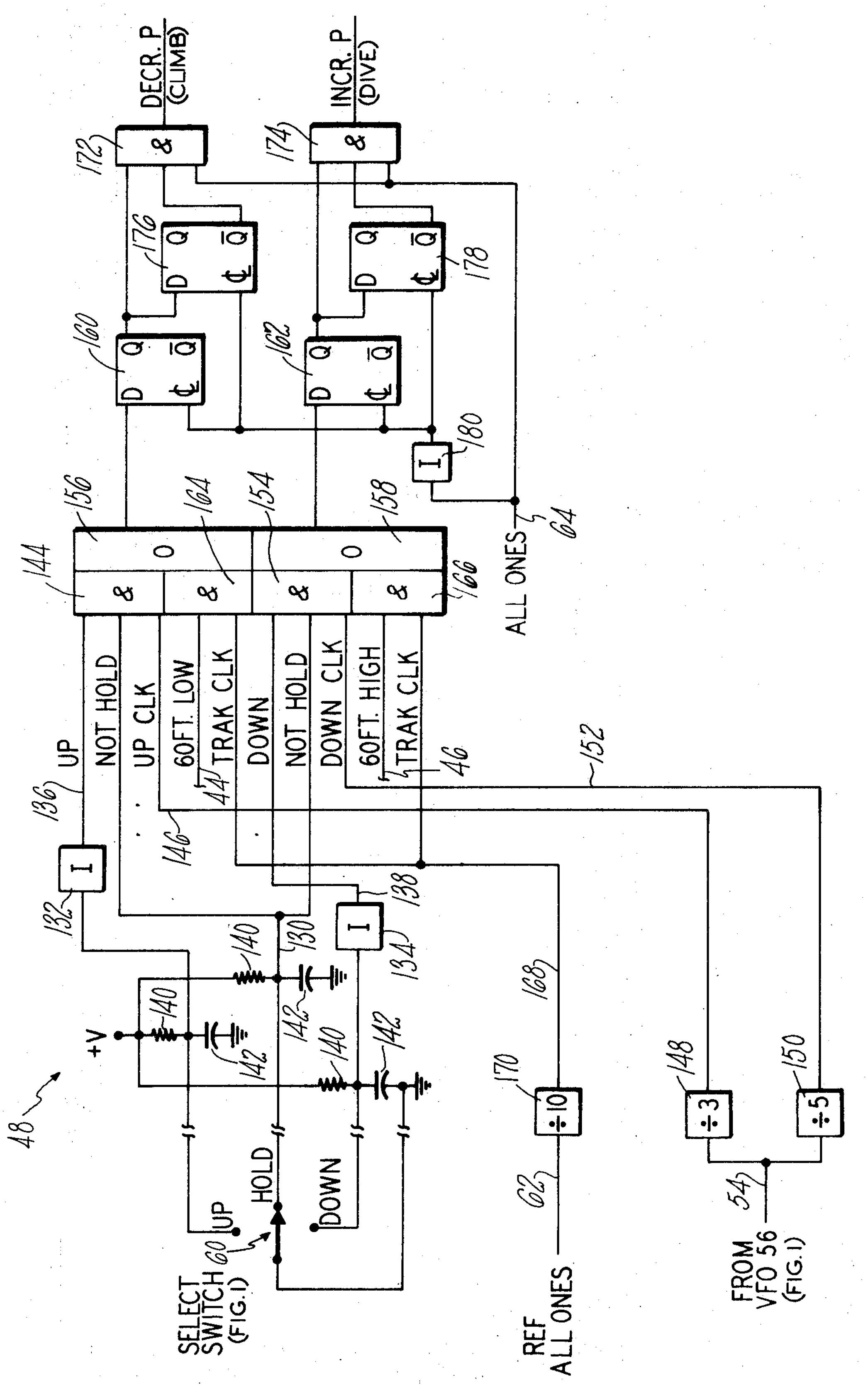

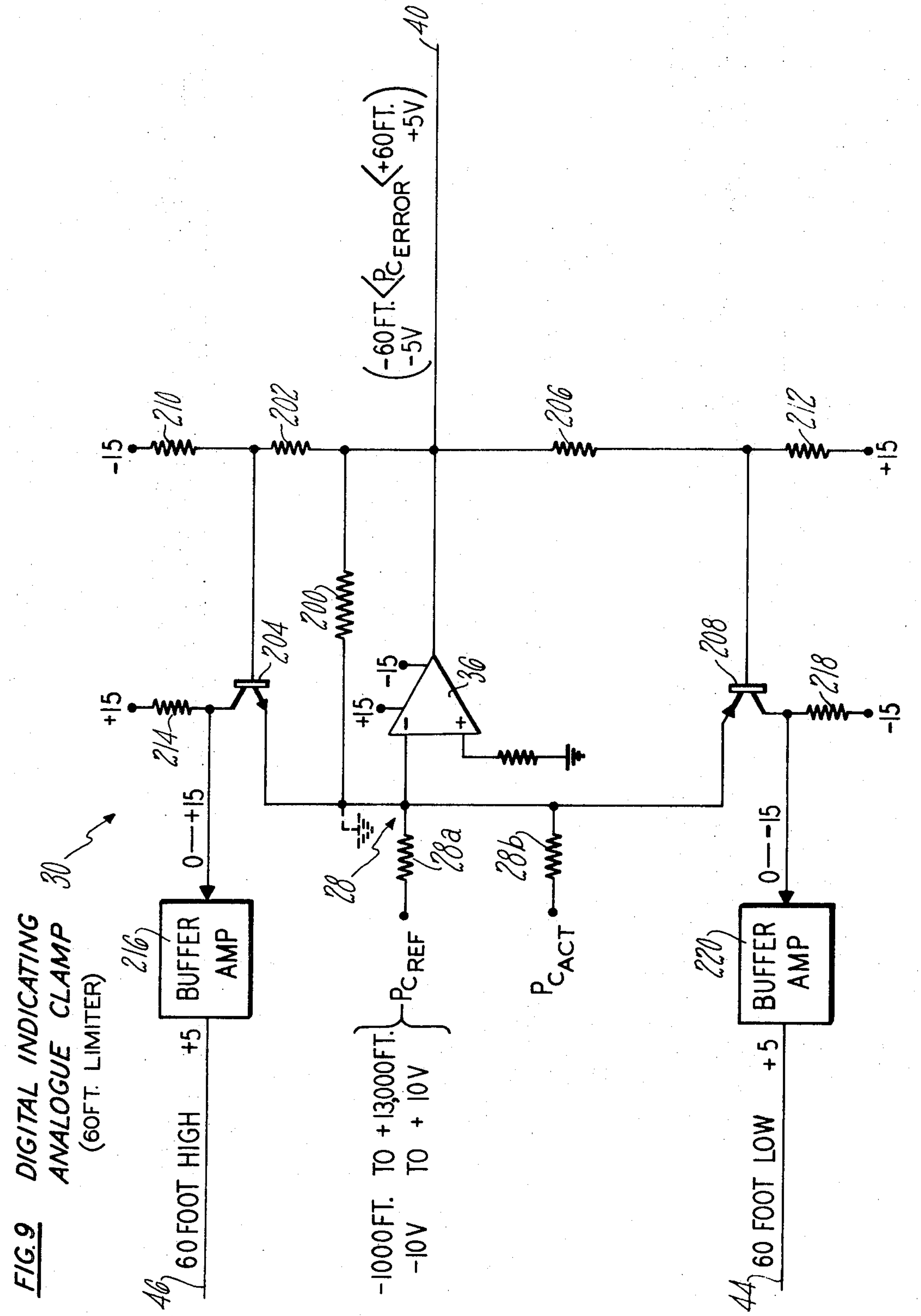
FIG.9 DIGITAL INDICATING ANALOGUE CLAMP (60FT. LIMITER)

DIGITAL INTEGRATOR

BACKGROUND OF THE INVENTION

1. Field of Invention

This invention relates to a digital integrator, to an aircraft pressure system in which the digital increase, decrease and hold commands are provided by the digital integrator, and to a combined digital/analog rate limiter for said aircraft pressure system.

2. Description of the Prior Art

There are many analog closed-loop systems known in the prior art. One form of such system is an aircraft cabin pressure controller which may provide an error signal for controlling the aircraft cabin pressurization system in response to the difference between the actual cabin pressure and a reference cabin pressure. The reference cabin pressure may generally be adjusted at a settable rate so as to permit increasing or decreasing the pressure of the cabin. Such a system may typically employ analog signals throughout, so as to permit integration of the commanded rate of change over a period of time for a determination of the actual reference pressure currently being demanded by the controls.

There are, in addition, many types of integrating analog systems which have the capability of increasing or decreasing an error signal at a given rate.

Recent requirements in aircraft pressure systems are exemplary of a slightly different type of control which may require not only a decrease or an increase in a reference, but the ability to accurately hold the reference at a determined level or magnitude. In order to implement a control system capable of increase, decrease or holding, it is necessary to have an integrator which will not drift over the holding period in response to a command to hold the reference at its current level. Heretofore, such systems have been capable of implementation in an analog fashion only with rotary servomechanisms wherein the rotary rate is equivalent to the demanded rate of change. Thus, causing a zero rotary velocity of the mechanism will permit holding at a given rate. It has not, however, been possible heretofore to implement such a system in solid-state technology. Thus, any control system capable of demanding an increase, decrease or hold must be implemented with mechanical components which are subject to inaccuracies, unreliability, high maintenance, and add penalties of weight and space which are not tolerable in modern-day aerospace vehicles.

SUMMARY OF THE INVENTION

An object of the present invention is to provide reference signals at an increasing, a decreasing or a steady rate, without resorting to electromechanical components. Another object is to provide an improved aircraft cabin pressure control system. A further object is to provide an analog clamp having digital output indications of clamping operation without employing voltage comparison circuits.

According to the present invention, a reference accumulator overflows after a fixed number of counts in every cycle, and a data accumulator overflows after said fixed number of counts, or after one more or one less number of counts under control of commands which may be either manually or automatically generated. The overflows set and reset a flip-flop, the length of the output of which comprises a pulsewidth modulated data signal which is controlled by the present invention. By controlling the rate at which alternatively higher or lower numbers of counts are permitted in the data accumulator, the rate of change of the output signal is controllable. The output signal can be held precisely to a current value by not causing a higher or lower count in the data accumulator in contrast with the count between overflows in the reference accumulator.

In further accord with the present invention, an aircraft cabin pressure control system employs the digital integrator of the invention to permit increase, decrease, or constant reference pressure signals to be generated, either manually or in response to automatic tracking. The system in accordance herewith also employs an altitude pressure difference limiter which provides analog feedback in the generation of the error pressure signal, and digital feedback to control the digital integrator input to the error pressure signal generator.

In accordance still further with the present invention, a digital indicating analog clamp includes complementary switches responsive to amplifier output signals in excess of a given magnitude of either polarity to selectively operate a corresponding one of the two switches, the operation of either switch severely reducing the gain of the amplifier so as to clamp its output and also providing a signal indicating that clamping action of a given polarity has occurred.

The digital integrator in accordance to the present invention provides the capability for increase, decrease or hold commands in a variety of systems and utilizations with a high degree of accuracy. An aircraft cabin pressure system in accordance with the present invention provides accurate control, either manually or through automatic tracking, of an increase, a decrease or a constant cabin pressure demand without the need for rotary electromechanical equipment. It is, therefore, capable of implementation in modern microcircuit and solid-state technology, thereby having inherently greater reliability, and lower cost and space requirements.

The foregoing and other objects, features and advantages of the present invention will become more apparent in the light of the following detailed description of preferred embodiments thereof, as illustrated in the accompanying drawings.

BRIEF DESCRIPTION OF THE DRAWINGS

FIG. 1 is a schematic block diagram of an aircraft cabin pressure control system in accordance with the present invention;

FIG. 2 is a schematic block diagram of a digital integrator in accordance with the present invention;

FIG. 4 is a schematic diagram of a 21-bit variable counter which may be used in the reference accumulator of the digital integrator of FIG. 2;

FIG. 5 is a timing diagram illustrating the operation of the variable counter of FIG. 4;

FIG. 8 is a schematic diagram of a control circuit for controlling the digital integrator of FIG. 2 within the aircraft cabin pressure control system of FIG. 1; and FIG. 9 is a schematic diagram of a digitally indicating analog clamp in accordance with the present invention.

DETAILED DESCRIPTION OF THE PREFERRED EMBODIMENTS

Figure 3:
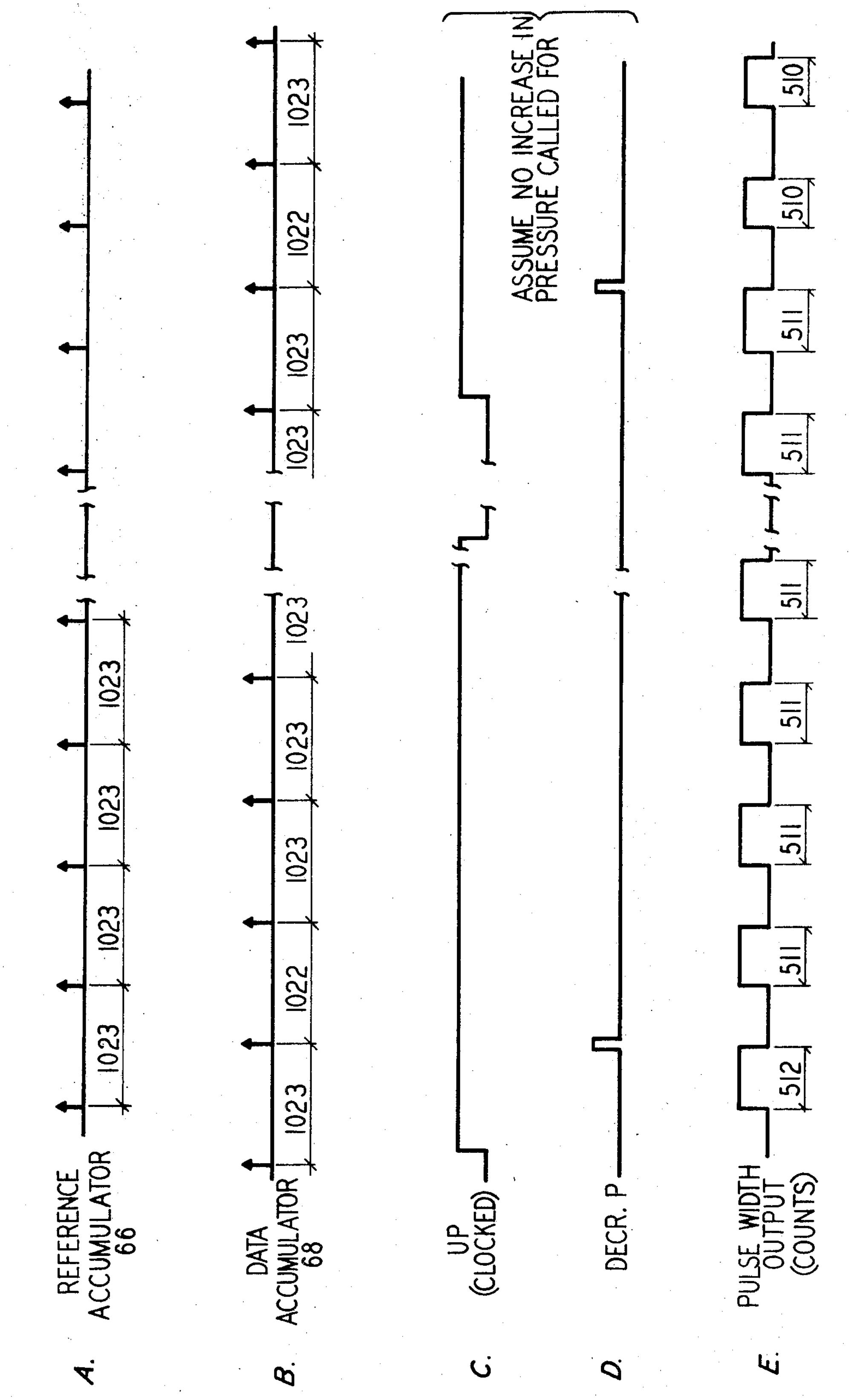
FIG. 3 is an illustration of the rate-controlled variable counting of the present invention.

Referring now to FIG. 1, an aircraft pressure control system includes a digital integrator 20, the output of which on a line 22 comprises a pressure reference or command signal in pulsewidth modulated form. This is passed through a filter 24 to provide an analog voltage indication of the pressure reference signal ($Pr$), which is fed over a line 26 to a summing network 28 within a 60-foot limiter 30. This network 28 also responds to an actual cabin pressure signal ($Pc$) on a line 32 which is derived from a cabin pressure transducer 34. In normal operation, the difference between these two signals is fed through an amplifier 36, the output of which comprises the pressure error signal ($Pe$) which drives an integrating actuator loop in a cabin pressurization system that will alter the actual cabin pressure to drive the error to zero, in a fashion well-known in the prior art. The error signal ($Pe$) on line 40 is also fed to a dead-band feedback circuit 42, which normally comprises a high resistance feedback path, but which becomes a low resistance feedback path, thus clamping the output of the amplifier 36, whenever the error pressure signal in line 40 exceeds a magnitude which corresponds with either plus or minus 60 feet at sea level density. In normal operation, the amplifier 36 is high gain; but when the 60-foot limit is exceeded, then the feedback circuit 42 clamps the amplifier with a high amount of feedback, thereby providing it with low gain so that it will not allow any significant further increase in the error pressure signal (P*e*). The 60-foot limiter 30 also provides a pair of signals on corresponding lines 44, 46 indicating that the 60-foot limit has been exceeded by being in either an over altitude or an under altitude direction, respectively. These signals are applied to a control circuit 48 so as to cause an automatic generation of either a concomitant decrease pressure command signal on a line 50 or an increase pressure command signal on a line 52, for application to the digital integrator 20. The control 38 can control the digital integrator in an automatic tracking mode (in response to the limiter 30) or can control the digital integrator in response to manual controls. The manual controls are clocked by a controllable clocking signal on a line 54 which may, for instance, be generated by a VFO (variable frequency oscillator) 56 in response to the setting of a rate potentiometer 58. Thus, the rate at which the pressure in the cabin is to reflect increasing or decreasing altitude (decrease or increase in pressure) may be varied by the operator-adjusted rate potentiometer 58. In addition, the control 48 is manually controlled for increasing altitude, decreasing altitude or a constant altitude by the setting of a manually adjusted switch 60. Synchronization between the control 48 and the digital integrator 20 is accomplished, in part, by overflow signals from a reference accumulator on the line 62 and from a data accumulator on a line 64. The operation of an overall system in accordance herewith is described more fully in conjunction with the description and illustration of the various portions thereof.

Referring now to FIG. 2, the digital integrator 20 includes a reference accumulator 66 and a data accumulator 68. Each of the accumulators 66, 68 include an 8-bit fixed counter 70, 71 and a 2-bit variable counter 72, 74. Both of the accumulators 66, 68 are driven by a counter clock 76. Each of the fixed counters 70, 71 provides an overflow signal on a related one of the lines 62, 64; the overflow signal may be generated, for instance, by an ALL ONEs detectors 77, 79 as is known in the art. A signal on the line 62 causes the setting of a set-reset flip-flop 78, and a signal on the line 64 causes a resetting of the flip-flop 78. The pulsewidth modulated indication of the desired pressure signal is generated by the set output of the flip-flop 78. Thus, the higher the pressure command, the longer will be the time between the overflow of the reference accumulator 66 and the overflow of the data accumulator 68, and, therefore, the longer will be the period of time that the flip-flop 78 is set. This, of course, results in a signal having a greater width on the raw pressure reference signal line (P*rr*) 22. In order to maintain a constant reference pressure on the line 22, the relative time between the overflow of the two accumulators is held constant. This is achieved by having both accumulators 66, 68 count to 1023 before overflowing. Whenever the pressure signal is to be increased, then the data accumulator 68 must overflow at a somewhat later relative time with respect to the reference accumulator 66; and so it is caused to count to 1024 before overflowing while the reference accumulator 66 continues to count to 1023. Thus, the latch 78 will be set for a longer period of time before it is reset, and the signal on the raw reference pressure line 22 will be of a longer duration indicating a higher desired pressure. On the other hand, if a lower reference pressure is desired, then the data accumulator 68 is caused to count to only 1022 before overflowing so it will overflow relatively sooner with respect to the reference accumulator 66, thus causing the reset of the flip-flop 78 to occur more quickly providing a more narrow output signal on the line 22. The reference accumulator 66 is caused to count to 1023 instead of to 1024 (as is normally achieved in a 10-bit binary counter) so that a normal 10-bit binary counter may be used for the data accumulator 68 and it may, upon command, count one count higher than the reference accumulator. This permits the two accumulators 66, 68 to be implemented with standard 8-bit fixed counters and special 2-bit variable counters, instead of requiring an 11-bit special counter for the data accumulator 68. Thus, by causing the reference accumulator 66 to count one bit short at all times, a full count in the data accumulator 68 will be one bit higher than the count of the reference accumulator 66, one short count will cause the data accumulator 68 to count the same as the reference accumulator 66; and a count which is two bits short will be one bit shorter than the reference accumulator 66. Thus, digital integrator 20 has the ability to increase, decrease or hold the accumulation. Each of the fixed counters 70, 71 may be implemented as known in the art in the form of rippling binary accumulators, or up-counters. In addition, a well-known eight input AND circuit may be attached to each counter so as to provide the ALL ONEs detection (77, 79) necessary to provide the signals on lines 62 and 64. The input to each of the 8-bit fixed counters 70, 71 will be the overflow from the respective 2-bit variable counter 72, 74, the operation of which is described hereinafter.

The operation of the digital integrator 20 is illustrated in FIG. 3. Therein, illustration (*a*) shows that the reference accumulator 66 progresses through 1023 counts between each occurrence of detecting ALL ONEs on the line 62 (FIG. 2). Illustration (*b*) shows that the data accumulator 68 may have its count varied periodically, depending on how quickly a change in pressure (or other parameter controlled by the digital integrator) is to be accomplished. For instance, the first cycle of illustration (*b*) shows a count of 1023, which means it is progressing through its counts between successive ALL ONEs indications at the same rate as the reference accumulator 66. During this period of time, however, assume that an UP command is generated in the control circuit 48 (FIG. 1). This is shown in illustration (*c*). The next time the data accumulator 68 generates an ALL ONEs signal on line 64 (FIG. 2), it is fed back over the line 64 of the control circuit 48 (FIG. 1) to gate the UP command and cause a decrease pressure signal (DECR P) as shown in illustration (*d*). This causes the data accumulator 68 to skip two counts so that it will emit an ALL ONEs signal after only 1022 counts (illustration (*b*), second cycle 80). Illustration (*e*) shows that if the two accumulators were emitting ALL ONEs in a phase relationship equivalent to 512 counts prior to the decreased pressure signal, illustration (*d*), then they will be one closer to each other (511 counts) after the data accumulator skips two counts instead of only one count during the second cycle 80 of illustration (*b*). Thereafter, both accumulators may progress through many cycles at the same rate of 1023 counts between overflows. Some of this period of time is broken away in FIG. 3 for simplicity. At a later time, which is dependent upon the rate control of the system, another UP signal may be generated, illustration (*c*), causing another decrease pressure signal, illustration (*d* ), at the next sensing of ALL ONEs from the data accumulator 68. This will again cause the data accumulator 68 to skip two counts instead of one, as in the cycle 82 of illustration (*b*) in FIG. 3. Since it skips a count, it overflows more quickly than it did before, whereas the reference accumulator 66, illustration (*a*), continues to count the same number of counts between ALL ONEs, so that, as shown in illustration (*e*), the two counters will now have 510 counts (for instance) between the time that the reference accumulator 66 presents ALL ONEs and the data accumulator 68 presents ALL ONEs. In a similar fashion, if a DOWN signal were given instead of an UP signal, a pressure increase signal would have caused the data accumulator not to skip any counts so that it would have counted 1024 during cycle 80 and cycle 82; and the difference between the time when each of the accumulators sense ALL ONEs would have increased from 512 to 514 across the span of time illustrated in FIG. 3, assuming similar rates.

The 2-bit variable counter 72 of the reference accumulator 66 is illustrated in detail in FIG. 4. Therein, a pair of flip-flops 80, 82 comprise the 2-bit counter. The basic operation of the reference accumulator 66 is illustrated in Table I. Therein, equivalent times of FIG. 5 are shown in the leftmost column, the decimal value of the counts are shown in the next column, and the center columns reflect the setting of the fixed counter 70 as represented in binary notation. The right-hand two columns represent the setting of the variable counter 72 as expressed in grey code, which is chosen herein for the simplicity of circuit operation, as is known in the art. The lowest ordered bit of the reference accumulator 66 is the rightmost bit of Table I, which is the flip-flop 80 of the 2-bit variable counter 72 shown in FIG. 4. By defining decimal zero to be all ZEROs in the fixed counter 70 and 01 in the variable counter 72, and utilizing grey code representation for the two low order bit decimal values of 0, 1, 2 and 3, the relationship in Table I results. It is to be noticed that the function of the variable counter 72 has been implemented so as to skip the count of 1022 every time the reference accumulator counts from 0 through 1023 and back to zero. The variable counter 72 counts from 0 through 3 255 times and then counts 0, 2, 3 on the 256th cycle in order to achieve the operation described hereinbefore and shown in Table I. This is achieved by the circuitry of FIG. 4, as illustrated in FIG. 5, as follows.

Consider any time period during which there is no ALL ONEs signal on line 62 (that is all times except time periods 7, 8 and 9 in FIG. 5 and Table I). An AND circuit 84 is disabled by the low signal on line 62 so that the data input of flip-flop 80 is connected to the in-phase output of flip-flop 82 through an OR circuit 86. The data input of flip-flop 82 is connected to the out-of-phase output of flip-flop 80, resulting in a circuit well-known to the art as a grey code generator whose operation is described hereinafter.

Assume, as an example, that both flip-flops 80, 82 are in there reset (off) states as occurs in time period 11 in FIG. 5 and Table I. Because both flip-flops are in the reset condition, there will be no signal on the line 88 so that the OR circuit 86 will not enable the flip-flop 80. On the other hand, the data input to the flip-flop 82 is connected to the out-of-phase output of flip-flop 80 by a line 90; and since the flip-flop 80 is in the reset state, there will be a signal on line 90 enabling the data input of flip-flop 82. Thus, the clock signal (delayed through the two inverters 81, 83) which appears at the start of time period 12 will cause the flip-flop 82 to become set, giving a count of 2 (grey code 10 corresponding to decimal 2), as shown in Table I. With the flip-flop 82 set, then a signal is passed by a line 88 through

TABLE I - REFERENCE ACCUMULATOR

| TIME FIG. 5 | DECIMAL VALUE | ALL ONES 62 | FIXED COUNTER 70 (BINARY) | VARIABLE COUNTER 72 (GREY CODE) |
|---|---|---|---|---|
| | | | | 82 80 |
| 2 | 1015 | 0 | 1 1 1 1 1 1 0 1 | 1 1 |
| 3 | 1016 | 0 | 1 1 1 1 1 1 1 0 | 0 1 |
| 4 | 1017 | 0 | 1 1 1 1 1 1 1 0 | 0 0 |
| 5 | 1018 | 0 | 1 1 1 1 1 1 1 0 | 1 0 |
| 6 | 1019 | 0 | 1 1 1 1 1 1 1 0 | 1 1 |
| 7 | 1020 | 1 | 1 1 1 1 1 1 1 1 | 0 1 |
| 8 | 1021 | 1 | 1 1 1 1 1 1 1 1 | 0 0 |
| 9 | 1023 | 1 | 1 1 1 1 1 1 1 1 | Missing State 1 1 |
| 10 | 0 | 0 | 0 0 0 0 0 0 0 0 | 0 1 |
| 11 | 1 | 0 | 0 0 0 0 0 0 0 0 | 0 0 |
| 12 | 2 | 0 | 0 0 0 0 0 0 0 0 | 1 0 |
| 13 | 3 | 0 | 0 0 0 0 0 0 0 0 | 1 1 |
| 14 | 4 | 0 | 0 0 0 0 0 0 0 1 | 0 1 |
| 15 | 5 | 0 | 0 0 0 0 0 0 0 1 | 0 0 |

HIGH ORDER　　　LOW ORDER the OR circuit 86 to enable the data input of the flip-flop 80; similarly, since flip-flop 80 is not yet set, the signal input to flip-flop 82 still appears on line 90. Thus, the clock signal which appears at the start of time period 13 will cause both flip-flops 80, 82 to be set so that during time period 13 a decimal value of 3 (grey code 11) is set in the reference accumulator 66. With flip-flop 82 set, there continues a signal on line 88 to pass through the OR circuit 86 and enable flip-flop 80, but because flip-flop 80 is now set, there is no signal on the line 90 to enable flip-flop 82. Thus, when the clock signal rises at the start of time period 14, flip-flop 80 will be set but flip-flop 82 will not be set resulting in a grey code of 01 corresponding to decimal zero. Additionally, with flip-flop 80 set and flip-flop 82 in the reset condition, signals will appear on both of two lines 92, 94 to enable an AND circuit 96. A NOT CLK signal generated on line 85 by inverter 81 completes the enabling of AND circuit 96 and generates a signal on a line 98, during the second half of time period 14, which is connected to the input of the 8-bit fixed counter 70 (FIG. 2) and causes it to advance its setting by one count, from zero to 1 in binary code or zero to 4 in decimal value (fixed counter 70 equals decimal 4 while variable counter 72 equals decimal 0). Thus, in time period 14, the decimal value of 4 is set in the reference accumulator 66. During time period 14, flip-flop 80 is set, resulting in a low signal applied to the data input of flip-flop 82 on line 90. Similarly, the data input to flip-flop 80 is low since it is connected through OR circuit 86 and line 88 to the in-phase output of flip-flop 82 which is reset during this time period. Thus, at the start of time period 15, the clock resets both flip-flops 80, 82. As in time period 11, this is grey code 00 which has a decimal value of 1 so that the decimal value of the reference accumulator 70, which is the sum of the variable counter 72 (decimal 1) plus the binary counter (decimal 4), is equal to 5 during time period 15 as shown in Table I.

Therefore, as long as the ALL ONEs signal is not present on line 62, the flip-flops 82, 80 function as a grey code counter (00, 10, 11, 01, 00, etc.) with an output pulse occuring on line 98 during the second half of any time period that the grey code is 01 (flip-flop 82 reset and flip-flop 80 set). Each output pulse on line 98 is counted by the fixed counter 70.

After 255 output pulses have occurred on line 98, the fixed counter 70 is in its ALL ONEs state as shown at time 7 in FIG. 4 and Table I. The resulting ALL ONEs signal on line 62 enables AND circuit 84 which now responds to a signal on line 90 indicating flip-flop 80 is off. But since in time period 7 flip-flop 80 is on, there is no signal from line 90 into the AND circuit 84; additionally, since flip-flop 82 is off, there is no signal on line 88 into the OR circuit 86. Thus, at the start of time period 8 when the clock signal is received, neither of the flip-flops will be set, giving rise to a decimal value of 1021. With flip-flop 80 off, however, then the line 90 will permit the setting of flip-flop 82 in response to a clock signal at the start of time period 9 and additionally will enable the AND circuit 84 since a signal is still present on the REF ALL ONEs line 62, so that at the start of time period 9 both flip-flops become set giving rise to a decimal indication of 1023. This results in skipping over the count of 1022, (which is achieved with the flip-flop 80 off and the flip-flop 82 on). In other words, flip-flop 80 has been turned on 1 cycle ahead of time as a result of the AND circuit 84 which in turn has resulted in skipping a count, thus making the reference accumulator a 1023 counter. Remaining portion of FIG. 5 in Table I illustrate resumption of normal counting, which continues again until the count of 1021 is reached, as just described.

Figure 6:
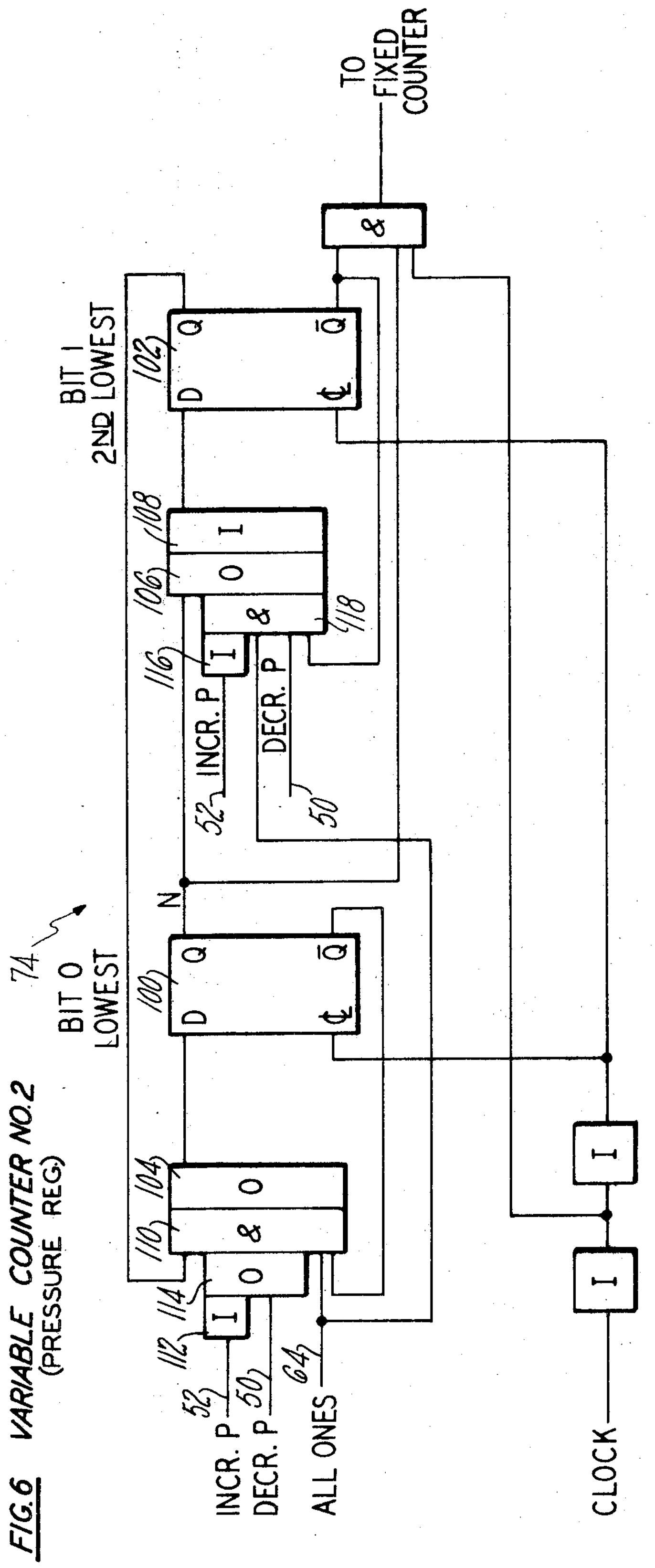
FIG. 6 is a schematic diagram of a variable counter which may be employed in the data accumulator of the digital integrator of FIG. 2.

Referring now to FIG. 6, the 2-bit variable counter 74 of the data accumulator 68 comprises a pair of flip-flops 100, 102, the data input of each being fed by a related OR circuit 104, 106, the OR circuit 106 having its output inverted by an inverter 108. At all times other than when an ALL ONEs signal is available on the line 64 AND circuits 110, 118 are disabled resulting a grey code counter connection as described hereinbefore for the 2-bit variable counter 72 of the reference accumulator 66 (FIG. 4). The clock signals cause the flip-flops 100, 102 to change state as is indicated during time periods 4—7 of Table I and FIG. 5 with respect to the 2-bit variable counter 72, hereinbefore. This is also reflected in the top portions of Table II and FIG. 7. Similarly, when neither an increase pressure signal on line 52 or a decrease pressure signal on line 50 are present, then an AND circuit 110 operates in a fashion similar to the AND circuit 84 in the 2-bit variable counter 72 (shown in FIG. 4 and described hereinbefore) to cause the data accumulator 68 to operate as a 1023 counter (in the same fashion as the reference accumulator 66) as shown in the top portion of Table II and FIG. 7. This is because of the fact that with no increase pressure signal on line 52, an inverter 112 will operate an OR circuit 114. With flip-flop 100 off and the ALL ONEs signal on the line 64, AND circuit 110 will operate the OR circuit 104 thus permitting setting of the flip-flop 100. Similarly, when there is no increase pressure signal on line 52, an inverter 116 can operate an AND circuit 118, but the lack of a decrease pressure signal on line 50 will prevent the AND circuit 118 from operating. Thus, the OR circuit 106 does not operate, causing the inverter 108 to enable the data input of the flip-flop 102. Both flip-flops 100, 102 are thus set at the start of time period 9 (Table II; FIG. 5), causing a skip over the 1022 count.

Consider next the case where a decrease pressure signal is received on line 50. According to the center portion of Table II, circuit operation requires that with ALL ONEs detected and both flip-flops in the reset condition, the next clock pulse (time 9) should turn on flip-flop 100 and should not turn on flip-flop 102. Flip-flop 100 is turned on because the OR circuit 114 is enabled by the decrease pressure on line 50, and the AND circuit 110 is enabled by the signal on the ALL ONEs line 64 and by the out-of-phase output of flip-flop 100. Thus, the OR circuit 104 will operate so that the next clock signal

TABLE II - DATA ACCUMULATOR 68

Figure 7:
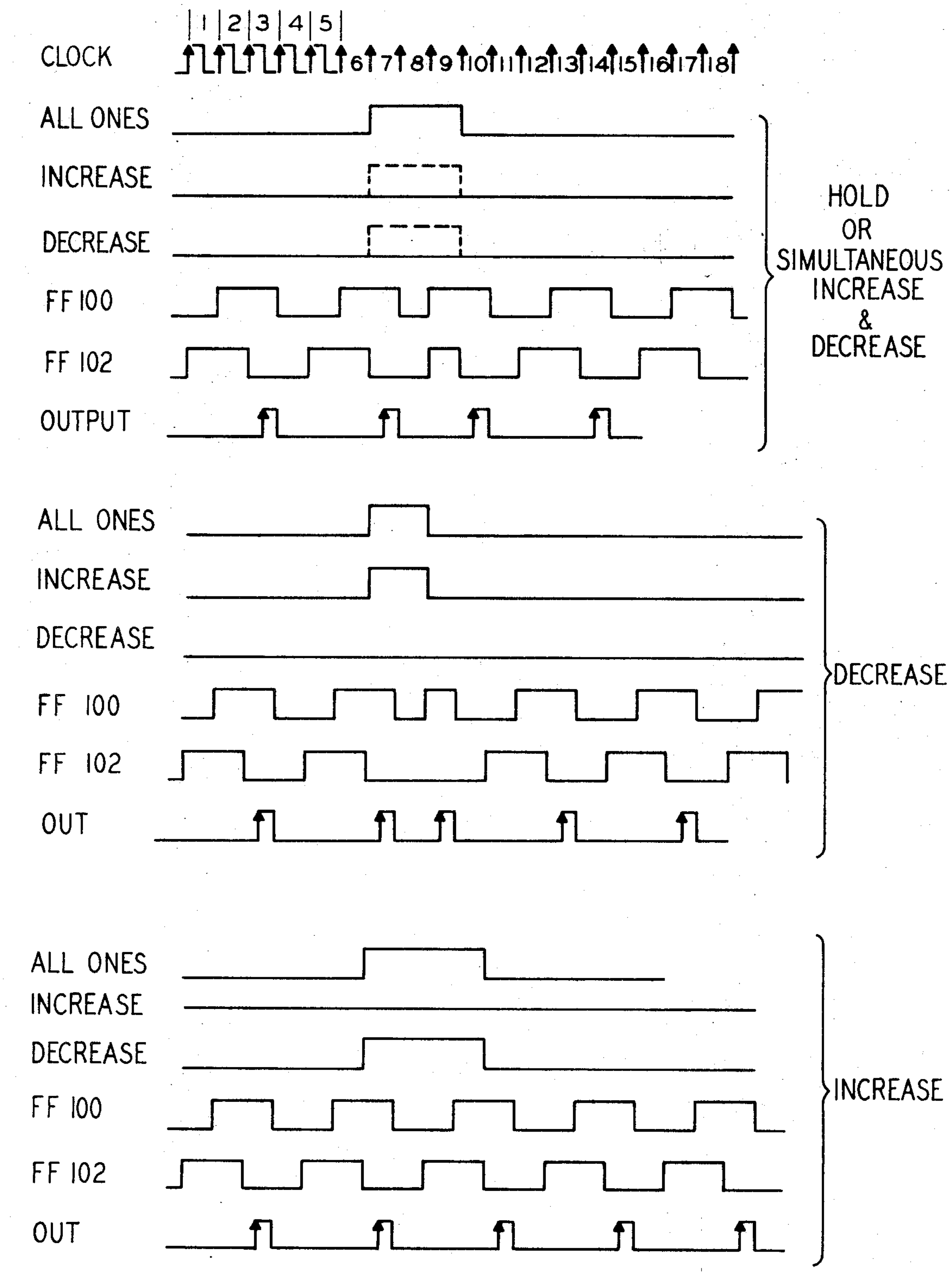
FIG. 7 is a timing diagram illustrating the operation of the variable counter of FIG. 6.

| TIME FIG. 7 | DECIMAL VALUE | ALL ONES 64 | FIXED COUNTER 71 (BINARY) | VARIABLE COUNTER 74 (GREY CODE) | |
|---|---|---|---|---|---|
| | | | | 102 100 | |
| 2 | 1015 | | 1 1 1 1 1 1 0 1 | 1 1 | |
| 3 | 1016 | | 1 1 1 1 1 1 1 0 | 0 1 | |
| 4 | 1017 | | 1 1 1 1 1 1 1 0 | 0 0 | HOLD |
| 5 | 1018 | | 1 1 1 1 1 1 1 0 | 1 0 | OR |
| 6 | 1019 | | 1 1 1 1 1 1 1 0 | 1 1 | SIMUL-TANEOUS |
| 7 | 1020 | X | 1 1 1 1 1 1 1 1 | 0 1 | INCREASE |
| 8 | 1021 | X | 1 1 1 1 1 1 1 1 | 0 0 | AND |
| 9 | 1023 | X | 1 1 1 1 1 1 1 1 | Missing State 1 1 | DECREASE |
| 10 | 0 | | 0 0 0 0 0 0 0 0 | 0 1 | |
| 11 | 1 | | 0 0 0 0 0 0 0 0 | 0 0 | |
| 12 | 2 | | 0 0 0 0 0 0 0 0 | 1 0 | |
| 13 | 3 | | 0 0 0 0 0 0 0 0 | 1 1 | |
| 14 | 4 | | 0 0 0 0 0 0 0 1 | 0 1 | |
| - | - | | - | - | |
| 6 | 1019 | | 1 1 1 1 1 1 1 0 | 1 1 | |
| 7 | 1020 | X | 1 1 1 1 1 1 1 1 | 0 1 | DECREASE |
| 8 | 1021 | X | 1 1 1 1 1 1 1 1 | 0 0 | |
| 9 | 0 | | 0 0 0 0 0 0 0 0 Two | States Missing 0 1 | |
| 10 | 1 | | 0 0 0 0 0 0 0 0 | 0 0 | |
| - | - | | - | - | |
| 6 | 1019 | | 1 1 1 1 1 1 1 0 | 1 1 | |
| 7 | 1020 | X | 1 1 1 1 1 1 1 1 | 0 1 | |
| 8 | 1021 | X | 1 1 1 1 1 1 1 1 | 0 0 | INCREASE |
| 9 | 1022 | X | 1 1 1 1 1 1 1 1 | 1 0 | (NO MISSING STATES) |
| 10 | 1023 | X | 1 1 1 1 1 1 1 1 | 1 1 | |
| 11 | 0 | | 0 0 0 0 0 0 0 0 | 0 1 | |
| 12 | 1 | | 0 0 0 0 0 0 0 0 | 0 0 | |

(time 9) will set the flip-flop 100. At the same time, the AND circuit 118 is enabled by the signal on the decrease pressure line 50, and by the output of the inverter 116 since there is no increase pressure signal on a line 52. This being so, the presence of a signal on the ALL ONEs lines 64 completes the operation of the AND circuit 118 so that OR circuit 106 will operate thereby causing inverter 108 to not present a signal to the data input of the flip-flop 102, so it cannot be set. This causes a setting of decimal zero to result, with flip-flop 100 on and flip-flop 102 off.

Now consider the presence of an increase pressure signal on line 52. As indicated in the bottom of Table II, this should cause the two flip-flops 100, 102 to operate as a true grey code counter without skipping any states whatsoever. The AND circuit 118 is blocked by the inverter 116 due to the presence of the increase pressure signal on line 52, while the AND circuit 110 is blocked because the inverter 112 is low due to the presence of the increase pressure signal on line 52 and there being no decreased pressure signal on line 50, the OR circuit 114 is low and the AND circuit 100 cannot operate. Thus, the data input to the flip-flop 100 is connected to the in-phase output of flip-flop 102, and the data input of flip-flop 102 is connected to the out-of-phase output (actually the inverted in-phase output) of flip-flop 100 to create a grey code generator as described hereinbefore with respect to 2-bit variable counter 72 of FIG. 4. Therefore, when the increase pressure signal is present, and no decrease pressure signal is present, the flip-flop 100, 102 will progress through regular counting as in the case when no ALL ONEs are detected (time periods 2—6 at the top of Table II).

Consider now the case when both an increase pressure signal and a decrease pressure signal appear on the lines 50, 52. In this case, operation is defined to be the same as when neither of them is present, as illustrated at the top of Table II and FIG. 5. As described hereinbefore, when neither of the signals are present on the lines 50, 52 the AND circuit 118 at the input to flip-flop 102 is to be disabled; this occurs when both signals are present. Similarly, the AND circuit 100 is enabled with both signals present as a result of the decrease pressure signal 50, (it being enabled by the inverter 112 when neither signal is present). The operation, therefore, proceeds as in the case of neither signal being present described hereinbefore with respect to time periods 7, 8, and 9 of Table II.

The gating of an output to the fixed counter 71 on a line 119 through an AND circuit 120, as well as the clocking of the flip-flops 100, 102 is under the clock control of a pair of inverters 121, 122 and operates as described hereinbefore with respect to FIG. 4.

The control circuit shown in FIG. 8 generates the decrease pressure signal on line 50 (which is the equivalent of a climb or increase in altitude), and the increase pressure signal on line 52 (which is equivalent to a dive or decrease in altitude). This may be done manually as called for by the UP-DOWN-HOLD switch 60, or it may be accomplished by automatic tracking as a result of the 60-foot limiter 30 (FIG. 1) in response to signals on the 60-FOOT LOW line 44 or the 60-FOOT HI line 46.

The armature of the switch 60 is connected to ground so that the tap to which it is connected will similarly be connected to ground. In the case of the HOLD tap, a line 130 will be positive whenever the switch is set to other than HOLD so that the signal thereon represents NOT HOLD. Both the UP and DOWN taps of the select switch are connected to related inverters 132, 134 to convert the ground state to a logical positive state. Thus, whenever the switch 60 is set to UP, the inverter 132 will present a signal on an UP line 136, and whenever the switch 60 is set to DOWN, the inverter 134 will provide a signal on a DOWN line 138. Whenever the switch 60 is not connected to any given one of the taps, then a related resistor 140 will cause a related line to assume a positive potential to which each of these resistors is returned. A plurality of capacitors 142 are provided to eliminate or to reduce noise in a fashion well known in the art.

When the select switch 60 is connected to the UP tap, the signal line 136 is energized thus enabling an AND circuit 144. The signal line 130 is positive since the HOLD tap is not grounded, so that the AND circuit 144 has two of its inputs present. All that remains is the presence of an UP CLK (clock) signal on a line 146. This signal is derived from a divide-by-three (3) counter 148 which in turn is driven by the output of the VFO 56 (FIG. 1) on line 54. This is the manually adjustable rate clock which determines the rate of increase or decrease in altitude (or pressure) within the cabin. Each time a clock signal is derived from the VFO 56 over the line 54, the divide-by-three counter 148 will be advanced one step. For each three steps, it will issue an UP CLK signal on a line 146. Similarly, a divide-by-five (5) counter 150 will issue a DOWN CLK signal on a line 152 to energize an AND circuit 154 once for every five signals received from the VFO on line 54.

The purpose of the divide-by-three and divide-by-five counters 148, 150 is to provide proper rates for increasing and decreasing altitudes. The human comfort factor has been shown to indicate that the diving rate should only be three-fifths as great as a climbing rate for equivalent comfort. The actual rates employed are adjustable, but the following consideration may be taken into account. A usual maximum pressure change rate may be considered to be 3,000 feet per minute. Assuming that a 2.046 MHz. counter clock 76 is used for operating the accumulators 66, 68 this will result in a 2000 Hz. repetition of the ALL ONEs signal from the reference accumulator 66. Assuming that the parameters of the system are chosen so that 10 feet of altitude pressure variation result from each bit of granularity in the count difference between the two accumulators 66, 68 at the 2.046 MHz. rate, to accommodate a total 10,000 foot altitude adjustment capability, a 5-bit per second maximum manual frequency will result. This 5-bit per second maximum manual frequency will relate to the climb condition and will result if the VFO has a maximum output frequency of 15 Hz. This in turn provides an 1,800 feet per minute maximum diving rate due to the difference between the divider 148 and divider 150. Thus, a VFO frequency between 0.5 Hz. and 15 Hz. may be chosen conveniently. If the VFO is adjusted to about 5 Hz., this will give 500 feet per minute climbing rate of 300 feet per minute diving rate, which are found to be suitable maximum rates for passenger comfort.

If either an UP or a DOWN is indicated by the switch 60 when a clock signal is received by either the AND circuit 144 or the AND circuit 154, a corresponding OR circuit 156, 158 will be energized to enable the data input of a related D-type flip-flop 160, 162. The OR circuits 156, 158 may also be energized by corresponding AND circuits 164, 166. Each of these circuits is driven by a tracking clock signal on a line 168 which is derived from a divide-by-ten (10) counter 170 which is fed by the REF ALL ONEs signal on the line 62. The purpose of the divide-by-ten counter 170 is to limit the rate of increase or decrease in pressure when the 60-foot limiter senses that the pressure differential between the desired and actual cabin pressures exceed a pressure equivalent of 60 feet at sea level density. In the foregoing example, with a 2 kHz. overflow of the reference accumulator, the tracking clock signal on line 168 will be at 200 Hz. This is equivalent to a climbing or diving rate of 220,000 feet per minute. This is significant because, regardless of the fact that the tracking circuit may be causing a decrease in pressure (a climb) while the operator has the switch 60 set to the DOWN position indicating an increase in pressure, the ratio is 40 to 1 in favor of the automatic tracking system so that the tracking system will prevail and cause the digital integrator 20 (FIG. 1) to fall into line quite quickly.

Each of the latches 160, 162 feeds a related AND circuit 172, 174, another input of which is the off side of an additional corresponding flip-flop 176, 178. The purpose of the flip-flops 160, 176; 162, 178 is to insure that only one pressure command signal (50, 52) will appear at the output of the control 48 for each clock signal (146, 152, 168) in order to ensure that these clock signals do control the rate of increase or decrease. For each signal out of either of the OR circuits 156, 158, the related one of the flip-flops 160, 162 will be enabled so that a clocking signal presented by an inverter 180 in response to the disappearance of the ALL ONEs signal on line 64 from the data accumulator will cause one of the flip-flops 160, 162 to be set. This then causes an input to the related AND circuit 172, 174 and since the flip-flops 176, 178 are in the reset condition, the next time that an ALL ONEs condition is sensed in the data accumulator, a signal on line 64 will cause the related AND circuit 172, 174 to present a corresponding decrease pressure signal on line 50 or increase pressure signal on line 52. The following ALL ONEs signal will cause the inverter 180 to set flip-flops 176, 178, so no further gating of AND circuits 172, 174 can occur until related flip-flops 160, 176; 162, 178, are reset following the turnoff of a corresponding AND circuit 156, 158. This circuit operates as a data synchronizer, in a fashion well known in the art.

Referring now to FIG. 9, the 60-foot limiter 30 comprises the amplifier 36 which is fed by the summing network 28 (shown in FIG. 9 to comprise resistors **28*a* and 28*b*) together with a feedback resistor 200 which is connected into the summing network 28. In parallel with the feedback resistor 200 is a resistor 202 and the base-emitter path of a transistor 204 as well as a resistor 206 and the base-emitter path of a transistor 208. The base of the transistor 204 is connected through a resistor 210 to a minus potential, and the base of the transistor 208 is connected through a resistor 212 to a positive potential. The collector of the transistor 204 is connected through a resistor 214 to a positive potential, and the voltage developed across the resistor 214 is coupled through a buffer amplifier 216 to generate the 60-FOOT HI signal on the line 46. Similarly, the collector of transistor 208 is connected through a resistor 218 to a negative potential, and the voltage across the resistor 218 is coupled through a buffer amplifier 220 to form the 60-FOOT LOW signal on the line 44. These signals are applied to the control circuit 48 illustrated in FIG. 8 and described in detail hereinbefore. The resistor 200 is a high resistance, typically megohms. On the other hand, the resistors 202 and 206 are much smaller resistors, and may typically be in the range of 1 to 10,000 ohms. So long as the error signal on line 40 is maintained between voltage values equivalent to 60 feet of altitude at sea level density (which may, for instance, be between 5 volts positive and 5 volts negative), then the voltage at the base of transistor 204 remains substantially negative, and the voltage at the base of transistor 208 remains substantially positive so that neither of these transistors conduct. The amplifier 36, therefore, has only the resistor 200 in its feedback path; the gain of the amplifier 36 may be on the order of magnitude of 75 under this operating condition. However, assume that the voltage on the output line 40 becomes sufficiently positive to represent an error signal in excess of the differential equivalent to 60 feet of altitude at sea level density. Then the junction between the resistors 202 and 210 become sufficiently positive to drive the NPN transistor 204 into conduction. When this occurs, the resistor 202 is connected substantially in parallel with the resistor 200 thus reducing the feedback resistance around the amplifier 36 so that the gain thereof is substantially reduced. This in effect clamps the output of the amplifier 36 at approximately the limiting error signal voltage. In addition, with the transistor 204 conducting, there is a substantial potential drop across the resistor 214 which drop is sensed by the buffer amplifier 216 to generate the 60-FOOT HI signal on the line 46. In a similar fashion, if the error signal of the amplifier 36 on line 40 becomes negative to a point corresponding with a pressure equivalent of more than 60 feet of altitude at sea level density, then the junction between the resistors 206 and 212 will become sufficiently negative to drive the PNP transistor 208 into conduction thus causing the resistor 206 to be connected substantially in parallel with the resistor 200 giving the same effect as described hereinbefore with respect to transistor 204. It too will cause a voltage drop across the resistor 218 so that the buffer amplifier 220 will generate the 60-FOOT LOW signal on line 44**.

Notice that the 60-foot limiter 30 illustrated in FIG. 9 comprises a digitally indicating analog clamp that not only limits the error voltage but also provides a digital indication that the limiting condition has been reached. This avoids the necessity of voltage comparators to determine when limiting voltage situations have been reached, as is true of dead band amplifiers known to the prior art.

In the event that the 60-foot limitation feature of the invention is not desired in a given aircraft cabin pressurization control system, it should be understood that the digital integrator may be utilized together with the UP-HOLD-DOWN switch 60 and that portion of the controls of FIG. 8 relating only thereto. Thus, one may eliminate the AND circuits 164, 166 and the OR circuits 156, 158, and utilize the amplifier 36 of the 60-foot limiter 30 in FIG. 9 with simple feedback comprising only resistor 200.

Additionally, the digital integrator disclosed herewith may be utilized in any system as well as in the aircraft cabin pressure control system in which the digital integrator of the present invention is disclosed herein. The digital integrator may be used in any case where increase, decrease, and holding capability is required. This may comprise essentially the circuitry of FIGS. 2, 4, 6 and a portion of FIG. 8, as described hereinbefore.

Furthermore, the 60-foot limiter circuit 30 illustrated in FIG. 9 may be utilized in any application where a digitally indicating analog clamp, or dead band amplifier, is desired.

Although the invention has been shown and described with respect to preferred embodiments thereof, it should be understood by those skilled in the art that various changes and omissions in the form and detail thereof may be made therein without departing from the spirit and the scope of the invention.

I claim:

1. An aircraft cabin pressurization control system generating a pressure reference control signal comprising:

a cabin pressure transducer for generating an actual cabin pressure signal;

means including an integrator for generating a pressure reference signal;

means responsive to the magnitude of pressure error signal in excess of predetermined limits for generating automatic tracking control signals;

control means for causing said integrator to increase, decrease or hold the value of pressure reference signal being generated thereby, said control means including a manually operable up-hold-down switch, said control means also including means responsive to said automatic tracking signals for simulating the up and down operation of said manual switch;

means for deriving a pressure error signal in response to the difference between said actual cabin pressure signal and said reference pressure signal;

said pressure error signal means including a clamp responsive to a pressure error signal in excess of said given magnitude for preventing said pressure error signal from substantially exceeding said given magnitude.

2. An aircraft cabin pressurization control system generating a pressure reference control signal comprising:

a cabin pressure transducer for generating an actual cabin pressure signal;

means including a digital integrator for generating a pressure reference signal;

means responsive to the magnitude of pressure error signal in excess of predetermined limits for generating automatic tracking control signals;

control means for causing said integrator to increase, decrease or hold the value of pressure reference signal being generated thereby, said control means including a manually operable up-hold-down switch, said control means also including means responsive to said automatic tracking signals for simulating the up and down operation of said manual switch;

and means for deriving a pressure error signal in response to the difference between said actual cabin pressure signal and said reference pressure signal.